(12) United States Patent
Potts et al.

(10) Patent No.: US 7,886,864 B2
(45) Date of Patent: Feb. 15, 2011

(54) OVERSTEERING FEEDBACK RESPONSE FOR VEHICLE HAVING COMPOUND STEERING SYSTEM

(75) Inventors: Dean R. Potts, Maple Grove, MN (US); Mario Souraty, Plymouth, MN (US)

(73) Assignee: Caterpillar Paving Products Inc, Minneapolis, MN (US)

(*) Notice: Subject to any disclaimer, the term of this patent is extended or adjusted under 35 U.S.C. 154(b) by 1616 days.

(21) Appl. No.: 10/948,639

(22) Filed: Sep. 23, 2004

(65) Prior Publication Data

US 2006/0060410 A1    Mar. 23, 2006

(51) Int. Cl.
*B62D 7/15* (2006.01)
*B62D 5/06* (2006.01)

(52) U.S. Cl. .................. 180/408; 180/402
(58) Field of Classification Search ............ 180/20, 180/411, 421, 422, 402; 280/442, 468; 404/125, 404/126
See application file for complete search history.

(56) References Cited

U.S. PATENT DOCUMENTS

| | | | | |
|---|---|---|---|---|
| 3,412,659 A * | 11/1968 | Harbke et al. | ............... | 404/121 |
| 3,896,989 A * | 7/1975 | Ellis | ............... | 299/39.4 |
| 3,966,345 A * | 6/1976 | Kofel | ............... | 404/126 |
| 4,927,289 A * | 5/1990 | Artzberger | ............... | 404/117 |
| 5,082,396 A * | 1/1992 | Polacek | ............... | 404/117 |
| 5,154,439 A * | 10/1992 | Weyer | ............... | 280/468 |
| 5,562,175 A * | 10/1996 | Bjorsne et al. | ............... | 180/419 |
| 5,579,228 A * | 11/1996 | Kimbrough et al. | ............... | 701/41 |
| 5,725,230 A * | 3/1998 | Walkup | ............... | 280/442 |
| 5,948,030 A | 9/1999 | Miller et al. | | |
| 5,996,722 A * | 12/1999 | Price | ............... | 180/403 |
| 6,176,083 B1 | 1/2001 | Ikari | | |
| 6,389,343 B1 * | 5/2002 | Hefner et al. | ............... | 701/41 |
| 6,411,876 B1 * | 6/2002 | Badenoch | ............... | 701/41 |
| 6,450,523 B1 * | 9/2002 | Masters et al. | ............... | 280/426 |
| 6,546,323 B2 * | 4/2003 | Deguchi et al. | ............... | 701/41 |
| 6,549,835 B2 * | 4/2003 | Deguchi et al. | ............... | 701/41 |
| 6,557,662 B1 * | 5/2003 | Andonian et al. | ............... | 180/402 |
| 6,615,944 B1 * | 9/2003 | Horwath et al. | ............... | 180/204 |
| 2002/0022915 A1 * | 2/2002 | Chen et al. | ............... | 701/42 |
| 2002/0032509 A1 * | 3/2002 | Akita | ............... | 701/41 |
| 2004/0129491 A1 * | 7/2004 | Bean et al. | ............... | 180/411 |

* cited by examiner

*Primary Examiner*—Lesley Morris
*Assistant Examiner*—Daniel Yeagley
(74) *Attorney, Agent, or Firm*—Liell & McNeil

(57) ABSTRACT

A vehicle with a compound steering system has the ability to reorient both a forward and aft steering axis with respect to a chassis. The compound steering system is controlled in a manner in which one of a forward steering actuator and an aft steering actuator will reach its mechanical limit before the other, when a steering command from an operator input results in an oversteer condition. An oversteer feedback system provides an indication to the operator that the vehicle is in a oversteer condition, such as by increasing the rotational resistance level of the steering wheel to a medium level when in an oversteer condition.

20 Claims, 4 Drawing Sheets

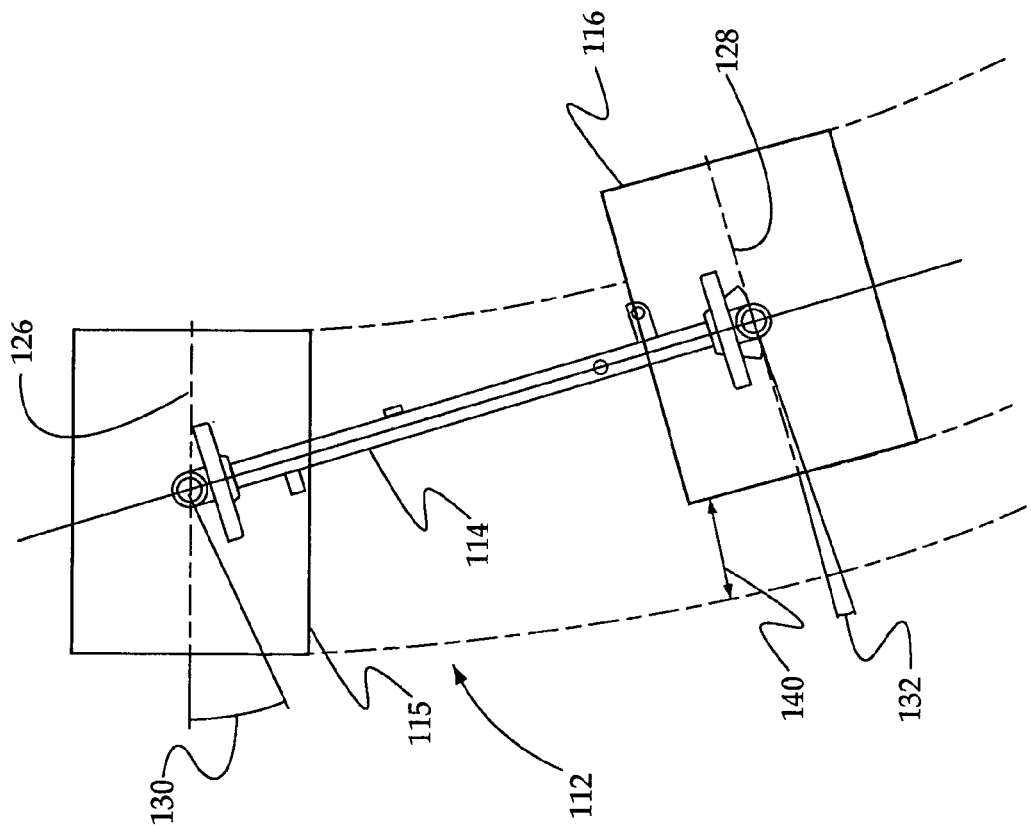
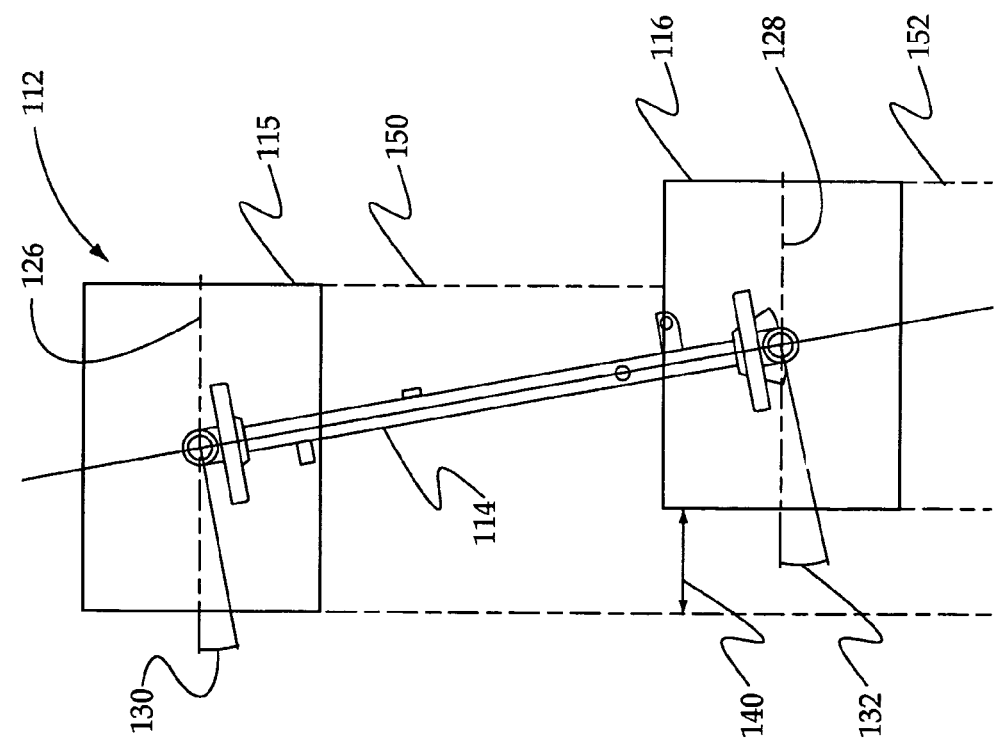

OVERSTEERING FEEDBACK RESPONSE FOR VEHICLE HAVING COMPOUND STEERING SYSTEM

TECHNICAL FIELD

This disclosure relates generally to vehicles with compound steering systems, and more particularly to an oversteering feedback response to an operator of such a vehicle.

BACKGROUND

In one class of vehicles, such as double drum compactors telehandlers, some consumer sized trucks and the like, a compound steering system allows for steering via the front wheels or drum and/or the rear wheels or drum. The forward steering subsystem and the aft steering subsystem operate within angular limits defined by various mechanical linkages and stops known in the art. For example, the rotation axis of the front wheels may be able to be reoriented within mechanical limits between plus and minus 25°, and the aft steering system may have similar or different angular limits. These compound steering systems typically enhance vehicle maneuverability capabilities in a way well known in the art. For instance, in the case of a telehandler, the vehicle can maneuver in relatively confined spaces not realistically possible with a vehicle not having a compound steering system. In another example, a double drum compactor might have the ability to operate in an offset mode in which the forward and aft drums move over offset or overlapping paths when the compactor is moving forward.

In the past, there was typically a direct mechanical linkage between the operator steering input device (e.g. steering wheel) and the actuators that serve to reorient the wheels or drum relative to the vehicle chassis. In more recent years, that direct mechanical linkage has yielded to electronically controlled steering actuators that respond to electronic control signals in a well known manner. For instance, movement of the operator's steering input device sends a signal to an electronic control module that is interpreted, and then an appropriate control signal is sent to the electronic actuators operably coupled to the wheels or drums. Typically, the steering actuators might be electro-hydraulic steering actuators of a type known in the art.

Because of the lack of a mechanical linkage between the operator steering input device and the steering actuators, the art teaches the application of resistance to moving the operator steering input device in order to provide a more familiar feel to the operator and for other reasons known in the art. For instance, co-owned U.S. Pat. No. 6,389,343 to Hefner et al. teaches a steering resistance device for a vehicle with electronically controlled steering that creates artificial resistance on the operator steering input device via a variable viscosity fluid that surrounds the steering shaft. In one example, the variable viscosity fluid is either an electro-rheological or a magneto-rheological fluid whose viscosity related sheer properties can be varied by varying the strength of either an electric or magnetic field through the fluid, respectively. Hefner et al. also teaches the concept of increasing the artificial resistance to the operator input device adjacent the mechanical limits by increasing that resistance so as to alert the operator that the vehicle is at its turning limits, and further turning of the operator steering input device would produce no additional turning capability. Hefner et al., however, fails to contemplate compound steering systems and the unique circumstances associated with the same.

In one potential area of concern, when a double drum compactor is operating in an offset mode in which the forward and aft drums move over offset pathways, maintaining a predetermined offset distance while turning can be problematic. In some instances, the electronic control module is programmed to distribute turning commands between the forward and aft drums in order to maintain a predetermined offset. However, when the mechanical limit of one of those turning subsystems is reached, the predetermined offset can not be maintained. When one of the two steering subsystems in a compound steering system reaches its mechanical limit, the phenomenon is commonly referred to as an oversteer condition. If the operator is unaware that they have reached an oversteering condition when operating in an offset mode, the desired drum offset can be compromised, as the offset typically shrinks when operating in an oversteer condition. Thus, maintaining a predetermined offset when turning can be difficult for an operator to accomplish through observation techniques alone.

The present disclosure is directed to one or more of the problems set forth above.

SUMMARY OF THE DISCLOSURE

In one aspect, a vehicle includes forward and aft rotatable members that are attached to support a chassis. A compound steering system includes a first steering device operable to reorient the rotational axis of the forward rotatable member with respect to the chassis between first limits, and a second steering device operable to reorient the rotation axis of the aft rotatable member with respect to the chassis between second limits. An oversteer feedback system is operable to provide an indication to an operator when one of the first and second rotation axes is at one of the first and second limits, respectively.

In another aspect, a vehicle is operated and steered at least in part by moving an operator steering input device. Feedback is provided to an operator that is indicative of whether one of a first and second steering axis is at one of its limits.

BRIEF DESCRIPTION OF THE DRAWINGS

FIG. 4 is a top schematic view of a double drum compactor moving in a straight line while in an offset steering mode according to another aspect;

FIG. 5 is a top schematic view of the compactor of FIG. 4 while undergoing a nominal right hand turn;

DETAILED DESCRIPTION

Figure 3:
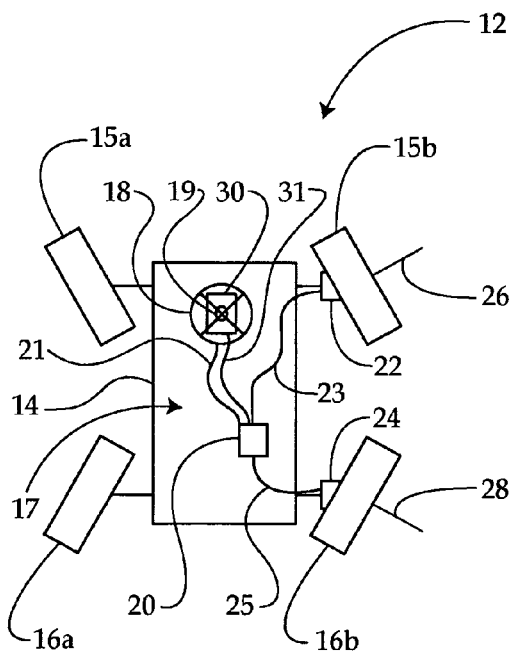
FIG. 3 is a schematic view of a vehicle according to one aspect of the present disclosure.
Figure 7:
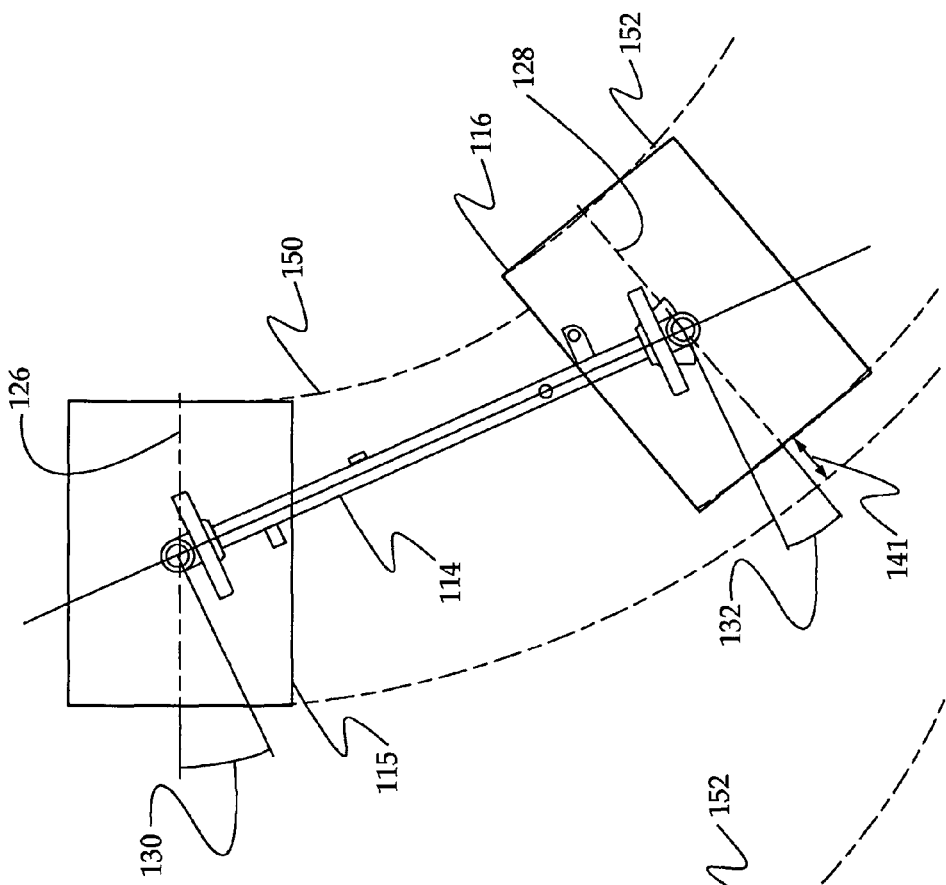
FIG. 7 is a schematic view of the compactor of FIGS. 4-6 when operating in a right hand oversteer condition.

Referring initially to FIG. 3, a top schematic view of a vehicle with a compound steering system is illustrated.

Vehicle 12 might be a telehandler, but could be any vehicle with a compound steering system, including double drum compactors, certain farm equipment and possibly even consumer motor vehicles. Vehicle 12 includes a chassis 14 that is supported by forward rotatable members 15*a* and 15*b*, and supported at its aft end by aft rotatable members 16*a* and 16*b*. In the case of a double drum compactor, forward rotatable member 15*a* and 15*b*, and aft rotatable members 16*a* and 16*b* are a single forward drum and a single aft drum respectively. The vehicle 12 is steered via an interaction between a compound steering system 17 and an operator steering input device 18, which is illustrated as a steering wheel attached to a rotatable steering shaft 19. The compound steering system 17 includes an electronic control module 20 that receives operator input signals via a communication link 21. The compound steering system 17 also includes first and second steering actuators 22 and 24 that receive control signals from electronic control module 20 via communication links 23 and 25, respectively. Steering actuators 22 and 24 can be any suitable actuators for reorienting respective first and second axes 26 and 28 with respect to chassis 14 to accomplish a steering task. For example, first and second steering actuators 22 and 24 might be conventional electronically controlled electro-hydraulic steering actuators of a type known in the art. Alternatively, actuators 22 and 24 could be any electronically controlled actuator known in the art. Although the compound steering system 17 illustrated in FIG. 3 shows the operator steering input device 18 operably coupled to the steering actuators 22 and 24 via an electronic control module 20, other structures are contemplated including a compound steering system 17 with substantially more mechanical linkages.

Those skilled in the art will appreciate that the first and second steering actuators 22 and 24 are typically operable between angular limits determined by mechanical stops within the steering mechanism and/or linkages. In most instances, the steering limits are at equal angles on opposite sides of a straight ahead travel direction. When the vehicle 12 has an electronic controller as illustrated in FIG. 3, the electronic control module 20 could be programmed with one or more operation modes that distribute steering commands from the operator steering input device 18 to the steering actuators 22 and 24 in a variety of equal or unequal manners. For instance, in one operation mode, vehicle 12 might first distribute all commands to the first or forward steering actuator 22 until it has reached its steering limit, and then further steering commands result in reorientation of the second or aft axis 28 via second steering actuator 24 until it reaches its limit and the vehicle is at its minimum turning radius. When the vehicle is operating in that range in which the forward steering actuator 22 has reached its mechanical limit but the aft steering device 24 has not, it can be said to be operating in an oversteer condition. Vice versa also being an oversteer condition. In other instances, such as in a double drum compactor offset steering mode as discussed earlier, the electronic control module 20 distributes turning commands to the steering actuators 22 and 24 in such a manner as to maintain a predetermined offset to the travel paths of the forward and aft rotatable member 15*a, b* and 16*a, b*. Those skilled in the art will appreciate that, depending upon the desired functionality of the vehicle 12, a variety of steering algorithms could be available to electronic control module 20 in order to accomplish a variety of tasks known in the art.

Preferably, vehicle 12 is equipped with an oversteer feedback system that is operable to provide an indication to the operator when one of the first and second axes 26 and 28 is at one of the first and second limits respectively. As stated earlier, when one, but not both, of the steering axes 26 and 28 is at its mechanical limit, vehicle 12 is said to be operating in an oversteer condition. Although the present disclosure prefers that the indication to the operator be tangible, such as via an interaction between the operator's hands and the operator steering input device 18, other indication means are contemplated. These other indications could be other tangible indications, such as a vibration transmitted through the operator's seat, via an audible indication that could include a distinctive sound, or might be a visual indication, such as a light, that appears in the operator's field of view. The disclosure also contemplates any combination of these indications for indicating an oversteer condition. However, the present disclosure prefers that the indication be a tangible indication only, and that the feedback indication be transmitted to the operator via a plurality of different resistance levels to movement of the operator steering input device 18. For instance, a steering drag device 30 of a type known in the art could apply a plurality of different resistance levels to rotatable steering shaft 19 based upon signals transmitted via communication link 31. In other words, electronic control module 20 would include some means, such as a sensor or the like, to detect when one or both steering actuators 22 and 24 is at its mechanical limit. That information is processed to transmit a resistance level signal to steering drag device 30 via communication link 31. The steering drag or resistance device could be of a type described in co-owned U.S. Pat. No. 6,389,343 in which either an electro or magneto rheological fluid is utilized to vary the resistance of the operator steering input device 18 to rotation of its rotatable steering shaft 19. Nevertheless, those skilled in the art will appreciate that any suitable means, including simple mechanical means, could be utilized in association with the present disclosure.

Figure 1:
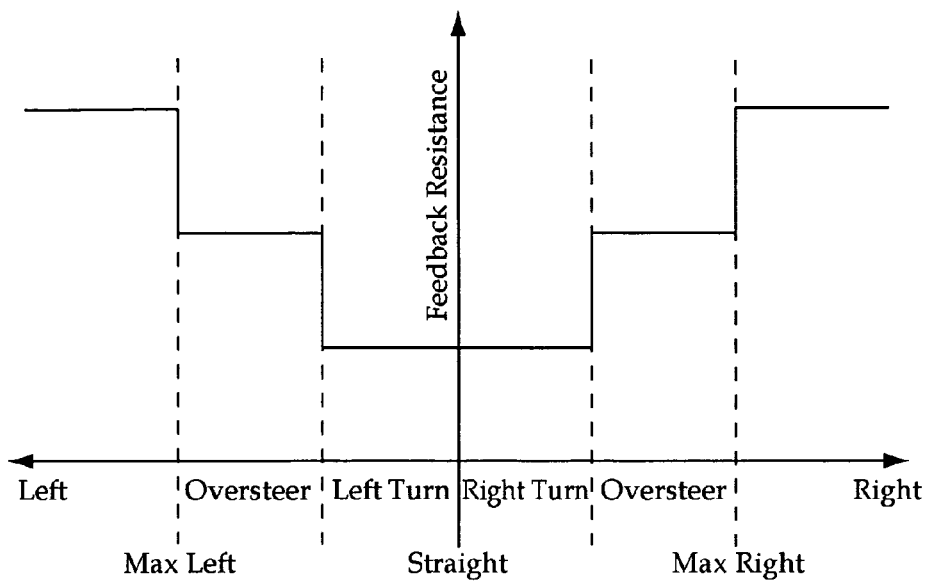
FIG. 1 is a graph of steering feedback resistance to vehicle travel direction according to one aspect of the present disclosure.
Figure 2:
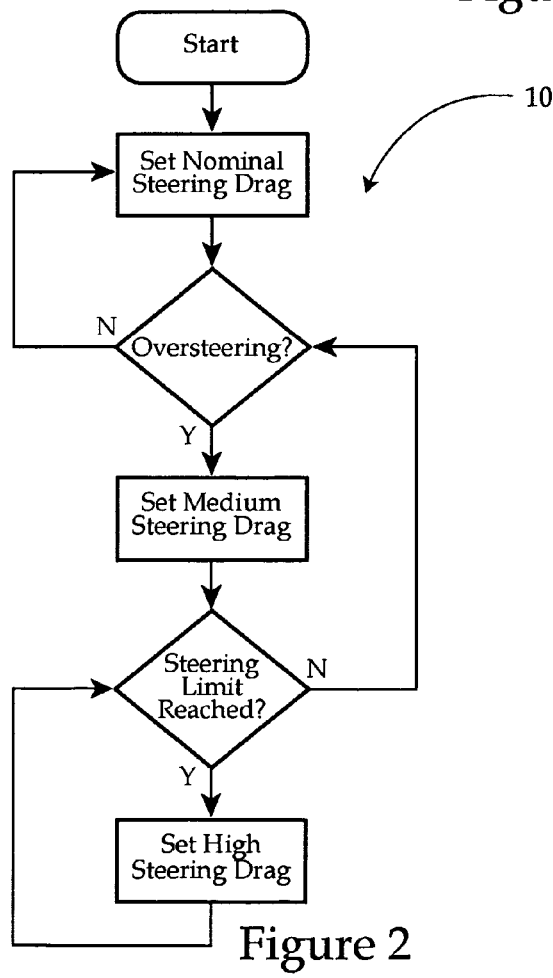
FIG. 2 is a software flow diagram corresponding to the graph of FIG. 1.

Referring now to FIGS. 1 and 2, an example steering feedback indication algorithm is illustrated both as a software flow diagram 10 in FIG. 2 and as a corresponding graph in FIG. 1. Software 10 would preferably be stored on a computer readable data storage medium for execution by a processor associated with electronic control module 20 in a conventional manner. When the vehicle 12 is started, the electronic control module 20 sets a nominal steering drag in steering drag device 30. In the illustrated example, steering commands from the operator steering input device 18 are distributed to the steering actuators 22 and 24 in such a manner as one of the steering actuators will reach its mechanical limit before the other. Thus, in the next part of the software code, there is a determination of whether vehicle 12 is operating in an oversteer condition. If so, the electronic control module 20 sets a medium steering drag in steering drag device 30. This is illustrated in FIG. 1 by the first step, or the medium steering drag level. When both of the steering actuators 22 and 24 reach their mechanical limits, the electronic control module 20 sets the steering drag to a high level in steering drag device 30. Thus, at the high resistance level, the operator will realize that further rotation of input steering input device 18, which may be rotatable through 360°, will produce no tighter turning radius for the vehicle 12. In a like manner, the elevation of the steering drag from a nominal level to a medium level when entering and proceeding through a oversteer condition, the operator can become accustomed to tangibly feeling when the vehicle 12 is in an oversteer condition, and can proceed to use that information to control the vehicle 12 accordingly. For instance, there might be reasons why the operator wishes to approach, but not actually enter, an oversteer condition, and this tangible feedback indication can allow the operator to control the vehicle 12 in such a manner. In the illustrated example, the varying resistance levels in steering drag device 30 are accomplished by increasing the field strength through the rheological fluid to at one of three levels to vary the resistance to rotation of the rotatable steering shaft 19 at nominal, medium and high levels.

Figure 6:
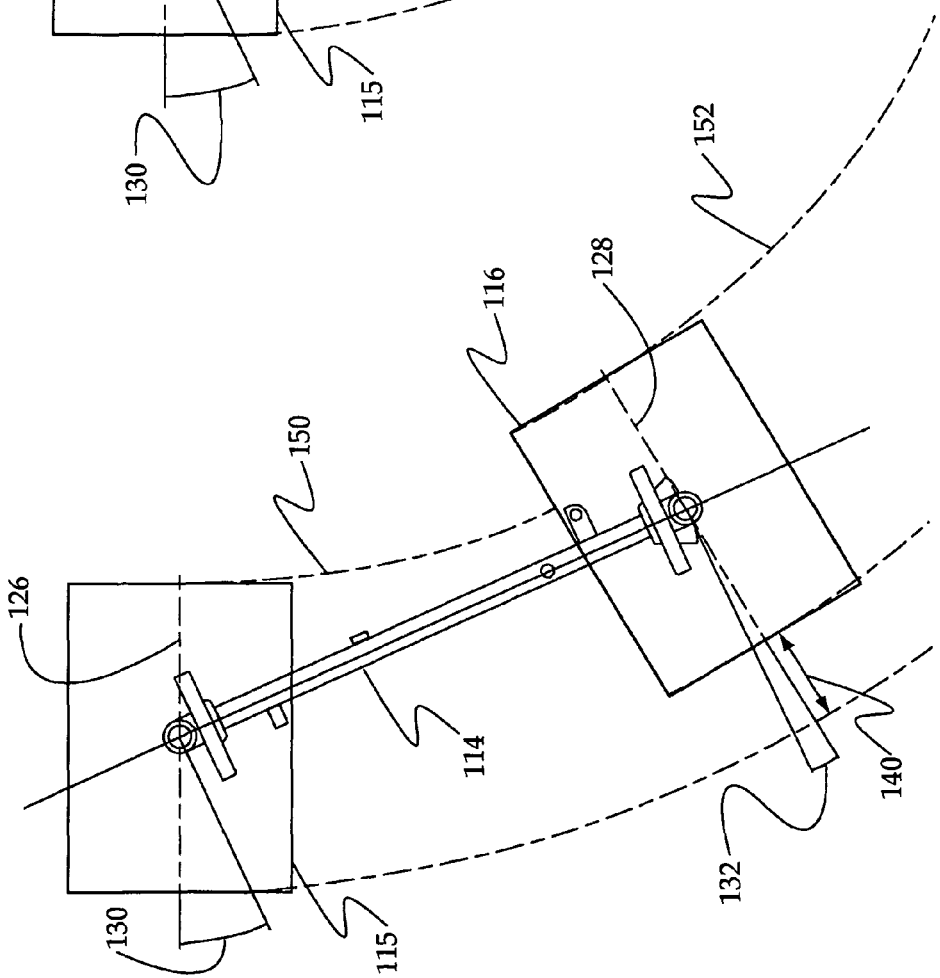
FIG. 6 is a view similar to that of FIG. 5 accept that the turning radius has reached a point that the forward steering device has reached its limit.
Figure 8:
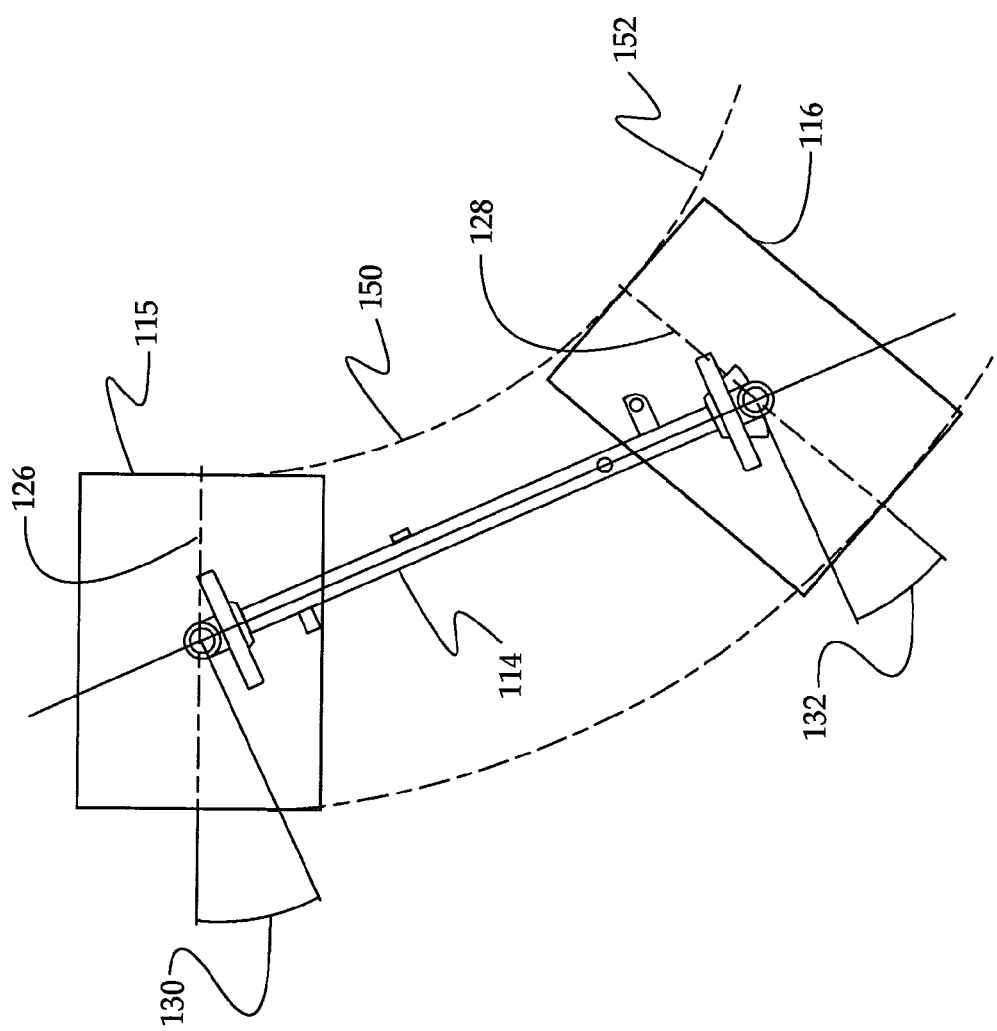
FIG. 8 is a schematic view of the compactor of FIGS. 4-7 when operating in a maximum turning condition with both forward and aft steering systems at their respective limits.

Referring now to FIGS. 4-8, a double drum compactor 112 is illustrated as operating in an offset mode such that the forward drum 115 and aft drum 116 will follow offset paths 150 and 152, respectively with some predetermined offset 140. In particular, double drum compactor 112 includes a chassis 114 that is supported by a forward drum 115 and an aft drum 116. The forward drum 115 is rotatable about a first or forward axis 126, which is reorientable with respect to chassis 114 via a forward steering actuator (not shown). Likewise, the aft drum 116 is rotatable about a second or aft axis 128 that is reorientable with respect to chassis 114 via a second steering actuator (not shown). In order to get the predetermined offset 140 in this example, front steering axis is set at a steering angle 130 of about 10°, while rear steering axis is set at a steering angle of minus 10° when the compactor 112 is traveling in a straight direction. The electronic control module of the double drum compactor 112 preferably includes known programming that causes the steering commands from the operator input device to be distributed to the forward and aft steering actuators in such a manner that the predetermined offset 140 is maintained when the double drum compactor 112 is turning, such as in FIG. 5. In order to accomplish the steering shown in FIG. 5 while maintaining the predetermined offset 140, front steering commands are distributed to the front steering axis such that it has increased to a fifteen degree turning angle 130, while the rear steering angle 132 has been decreased to about minus 3°. Those skilled in the art will appreciate, however, that that predetermined offset 140 is difficult to maintain when one of the steering actuators has reached its mechanical limit. FIG. 6 shows the forward steering axis at its mechanical limit, which is at a steering angle 130 of about 25°. At that point, and with the configuration illustrated, the electronic control module has merely reoriented the rear drum rotation axis to a steering angle 132 6° in order to maintain the predetermined offset 140. Thus, the operator could have expected to have experienced a nominal drag resistance to steering inputs when operating in the conditions between moving straight ahead as in FIG. 4 up to reaching an oversteer condition as in FIG. 6. Upon reaching the oversteer condition of FIG. 6, the electronic control module would elevate the steering resistance to a medium level as illustrated in FIG. 1. When this occurs, and if the operator continues to request a tighter turning radius, the electronic control module will further reorient the aft steering axis to achieve a tighter turning radius. However, the oversteer condition will be indicated to the operator in some suitable manner, such as via setting the steering drag device 30 (FIG. 3) to a medium level. When this occurs, the operator will be alerted to the fact that the predetermined offset 140 is no longer being maintained and instead a smaller offset 141 (FIG. 7) is currently occurring because the compactor 112 is in an oversteer condition. If the operator continues to request a tighter turning radius by further rotation of the rotatable steering shaft 19, the compactor 112 will arrive at a maximum steering condition as shown in FIG. 8, in which both the forward steering actuator and aft steering actuator (not shown) are at their respective mechanical limits. Those skilled in the art will appreciate that under these conditions, the travel paths 150 and 152 of the forward and aft drums 115 and 116 will become nearly coincident.

INDUSTRIAL APPLICABILITY

The present disclosure finds potential application to any vehicle that includes a compound steering system in which one of the two steering axes will reach its mechanical limit before the other, in response to steering commands from an operator. Thus, the present disclosure finds potential application to any vehicle with a compound steering system having an oversteer operating range in which one, but not both, of the steering axes is at its available limit. Such vehicles potentially include telehandlers, double drum compactors, some consumer sized trucks and other vehicles that have compound steering systems, especially those with electronically controlled steering systems that distribute steering commands from the operator steering input in an inequitable manner between the forward and aft steering axes. As illustrated above, the present disclosure is particularly well suited to double drum compactors 112 that have an electro-hydraulic steering system and have a mode in which there is a desire to maintain a predetermined offset between the forward and aft drums.

In the preferred method of operation, a steering drag device 30 is operable to resist movement of the operator steering input device 18 at a nominal level when both the first and second steering axes 26 and 28 are away from their respective first and second limits. This can be accomplished by setting a field strength in either an electro or magneto rheological fluid surrounding the rotatable steering shaft 19 to a nominal level. In the event that one of the first and second axes 26 and 28 has reached one of its respective first and second limits, an oversteer indication will be provided to the operator by elevating the steering drag device 30 to a medium level, such as by increasing the field strength in the rheological fluid. Finally, if both the first and second steering axes 26 and 28 reach their respective first and second limits, the steering drag device 30 will move to a high level in order to provide an indication to the operator that both steering axes 26 and 28 have reached their mechanical limits.

It should be understood that the above description is intended for illustrative purposes only, and is not intended to limit the scope of the present disclosure in any way. For instance, the disclosure describes the steering actuators as having angular limits. This description should be interpreted to mean that the physical steering limits may be present anywhere in the system, but the actuators are not able to go past the limits. For example, the angular limit may be outside the actuator, and may be a result of the linkage(s) in the steering system. Thus, those skilled in the art will appreciate that other aspects, objects, and advantages of the disclosure can be obtained from a study of the drawings, the disclosure and the appended claims.

What is claimed is:

1. A vehicle comprising:
   a chassis;
   a forward rotatable member attached to partially support the chassis and being rotatable about a first axis;
   an aft rotatable member attached to partially support the chassis and being rotatable about a second axis;
   a compound steering system including a first steering actuator operable to reorient the first axis with respect to the chassis between first mechanical limits, and a second steering actuator operable to reorient the second axis with respect to the chassis between second mechanical limits; and
   an oversteer feedback system operable to provide an indication to an operator of an oversteer condition characterized by one, but not both, of the first and second axes is at one of the first mechanical limits and second mechanical limits, respectively.

2. The vehicle of claim 1 wherein the indication includes a tangible indication, but the compound steering system permits reorientation of an other of the first and second axes toward a tighter turning radius.

3. The vehicle of claim 2 wherein the compound steering system includes an operator steering input device; and
the oversteer feedback system includes a steering drag device operable to resist movement of the operator steering input device at a plurality of resistance levels, and the tangible indication including an elevated resistance level; and
the plurality of resistance levels include a low resistance, a high resistance and a medium resistance level in the oversteer condition.

4. The vehicle of claim 3 wherein the operator steering input device includes a rotatable steering shaft that is rotatable through 360 degrees; and
the steering drag device includes a rotary resistance device operably coupled to the rotatable steering shaft.

5. The vehicle of claim 4 wherein the first steering actuator includes only a first electronically controlled actuator;
the second steering actuator includes only a second electronically controlled actuator; and
the compound steering system includes an electronic control module operable to receive steering request data from the operator steering input device, and control the first and second steering actuators based upon the steering request data.

6. The vehicle of claim 5 wherein the rotary resistance device includes at least one of a magneto-rheological fluid and an electro-rheological fluid.

7. The vehicle of claim 6 wherein the vehicle is a double drum compactor;
the first rotatable member includes a first drum;
the second rotatable member includes a second drum; and
the first and second drums follow overlapping paths.

8. The vehicle of claim 7 wherein the compound steering system includes a plurality of modes which includes an offset steering mode in which the overlapping paths of the first and second drums have a predetermined offset relative to each other, and the first and second axes are away from the first and second mechanical limits, respectively, while the vehicle is executing a turn.

9. The vehicle of claim 7 wherein the rotary resistance device is operable to resist movement of the operator steering input device at a nominal level when both the first and second axes are away from their respective first and second limits;
the rotary resistance device is operable to resist movement of the operator steering input device at the elevated level, which is a medium level, when one of the first and second axes are at one of their respective first and second limits; and
the rotary resistance device is operable to resist movement of the operator steering input device at a high level when both of the first and second axes are at one of their respective first and second limits.

10. The vehicle of claim 3 wherein the vehicle is a telehandler.

11. A method of operating a vehicle, comprising the steps of:
steering the vehicle at least in part by moving an operator steering input device;
providing feedback to an operator indicative of whether the vehicle is in an oversteer condition characterized by one, but not both, of first and second steering axes being at a mechanical limit; and
the steering step includes turning the vehicle to a tighter turning radius while in the oversteer condition.

12. The method of claim 11 wherein the providing step includes a tangible indication to the operator.

13. The method of claim 12 wherein the tangible indication includes elevating a resistance of the operator steering input device to movement while in the oversteer condition.

14. The method of claim 13 including the steps of:
setting a rotary resistance device to resist movement of the operator steering input device at a nominal level when both the first and second axes are away from their respective first and second mechanical limits;
setting the rotary resistance device to resist movement of the operator steering input device at a medium level when one of the first and second axes are at one of their respective first and second mechanical limits; and
setting the rotary resistance device to resist movement of the operator steering input device at a high level when both of the first and second axes are at one of the respective first and second mechanical limits.

15. The method of claim 14 wherein the setting steps are accomplished at least in part by changing an energy field strength in a rheological fluid.

16. The method of claim 12 including the steps of:
activating an offset steering mode in which a first chassis supporting rotational members and a second chassis supporting rotational member have overlapping travel paths that are offset to each other a predetermined offset while the vehicle is executing a turn.

17. A vehicle comprising
a chassis
an electronic control module carried by the chassis
a compound steering system including first and second steering actuators coupled via the electronic control module to an operator steering input device; and
the electronic control module including an oversteer algorithm operable to generate an indication when one, but not both, of first and second steering axes is at one of a first and second mechanical limits, respectively.

18. The vehicle of claim 17 wherein the oversteer algorithm includes means for detecting an oversteer condition; and
the indication includes a control signal to a rotary resistance device coupled to the operator steering input-device.

19. The vehicle of claim 18 wherein the indication includes the rotary resistance device having a rheological fluid controllable to nominal, medium and high resistance levels.

20. The vehicle of claim 19 wherein the chassis is supported by forward and aft compacting drums with overlapping travel paths.

* * * * *